United States Patent [19]
Kistner et al.

[11] Patent Number: 6,067,746
[45] Date of Patent: May 30, 2000

[54] INSECT TRAPPING DEVICE

[76] Inventors: Robert G. Kistner, 1804 Bonnibee Ct.; William C. Kistner, 5709 Lakehaven Dr., both of Raleigh, N.C. 27612

[21] Appl. No.: 09/246,424

[22] Filed: Feb. 8, 1999

[51] Int. Cl.[7] .............................. A01M 3/04; A01M 3/02
[52] U.S. Cl. ................................. 43/136; 43/135; 43/137
[58] Field of Search ............................. 43/135, 136, 137

[56] References Cited

U.S. PATENT DOCUMENTS

| | | | |
|---|---|---|---|
| 382,580 | 5/1888 | Wilmot | 43/136 |
| 602,083 | 4/1898 | Kimbel . | |
| 703,303 | 6/1902 | Purvis . | |
| 861,963 | 7/1907 | Fyfe . | |
| 1,154,310 | 7/1915 | Hemenway | 43/136 |
| 1,190,165 | 7/1916 | Hemenway | 43/136 |
| 1,623,006 | 3/1927 | Hamborg et al. . | |
| 2,776,520 | 1/1957 | Weeks | 43/135 |
| 3,191,339 | 6/1965 | Dougherty | 43/137 |
| 3,449,856 | 6/1969 | Weaver | 43/136 |
| 3,996,690 | 12/1976 | Ridings | 43/65 |
| 4,052,811 | 10/1977 | Shuster et al. | 43/136 |
| 4,126,959 | 11/1978 | Graham | 43/136 |
| 4,759,150 | 7/1988 | Pierce | 43/136 |
| 4,905,408 | 3/1990 | Wu | 43/137 |
| 4,914,855 | 4/1990 | Sherman | 43/136 |
| 4,974,360 | 12/1990 | Davis | 43/135 |
| 5,058,314 | 10/1991 | Frascone | 43/136 |
| 5,634,293 | 6/1997 | Mike | 43/136 |

*Primary Examiner*—Kurt Rowan
*Attorney, Agent, or Firm*—Mills Law Firm PLLC

[57] ABSTRACT

An adhesive insect trapping device having an elongated handle being fixedly attached to a flat plate member whereon a sheet of adhesive material is attached is disclosed. The plate member includes a foldable cover member being hingeably attached thereto so as to be secured in coplanar relation in an open position of the device. In the open position a sheet of adhesive material is arranged thereon to allow an insect to be adhesively captured on the device. The plate and cover members are foldable to a closed position wherein the adhesive sheet is folded 180° onto itself thereby entrapping the insect in an envelope formed from the adhesive sheet material for disposal. In one embodiment the insect trapping device is manually folded to contain the captured insect. In an alternative embodiment the insect trapping device is automatically folded by a trigger actuated spring mechanism which folds the device to capture the insect.

9 Claims, 4 Drawing Sheets

INSECT TRAPPING DEVICE

BACKGROUND OF INVENTION

1. Field of Invention

This invention relates to insect trapping devices and more particularly, to a device for adhesively trapping insects.

A variety of mechanical devices for adhesively capturing insects encountered along the interior windows or walls of a house are well known to those skilled in the art. An early example of such a fly catcher device is disclosed in U.S. Pat. No. 1,154,310. This device utilizes sticky fly paper which is secured within an open frame having inclined walls and a channel, in connection with a flanged back or clamp plate whose edges are adapted to functionally press and hold the edges of the sticky paper within the frame which is attached to an elongated handle.

U.S. Pat. No. 3,449,856 discloses a fly catcher comprising an elongated handle releasably attached to a throw-away type head member of thin, transparent, plastic material coated on one side thereof with an adhesive substance which will retain a fly upon contact therewith.

In yet another example U.S. Pat. No. 4,905,408 discloses an insect swatter having frame attached to an elongated handle whereon a porous sticky sheet is attached for adhesively trapping insects.

However, none of the above described insect trapping devices has proven to be entirely satisfactory for various reasons. Thus, the present invention has been developed to provide an adhesive insect trapping device which is simple and convenient to use and inexpensive to manufacture.

2. Description of Related Prior Art

U.S. Pat. No. 4,759,150 to Robert Pierce discloses an insect catcher having the appearance of a common fly swatter with a handle and a head portion, which insect catcher has a sheet of adhesive material disposed on the head and a hingeably attached cover arranged to cover the head when not in use.

U.S. Pat. No. 1,154,310 to William A. Hemenway discloses a fly catcher having a handle that is pivotally connected to a frame holder wherein a piece of sticky fly paper is retained for adhesively capturing flies and other insects.

U.S. Pat. No. 4,905,408 to Chia R. Wu discloses an insect swatter including a frame that is mounted on an integrally formed, elongated handle. The frame includes a plurality of protuberances which are aligned with a porous, sticky sheet of material for adhesively trapping insects thereon.

U.S. Pat. No. 3,449,856 to Ted T. Weaver discloses a fly catcher comprising an elongated handle that is releasably attached to a throw-away head member formed of a plastic material mounted on one side thereof with a tacky adhesive substance which will retain a fly upon contact therewith. The head members are arranged in a package so as to be free for separate removal of individual head members for successive attachment to the handle.

U.S. Pat. No. 4,126,959 to George L. Graham discloses an adhesive-lined insect capture device which comprises a dish-shaped retaining member attached to an elongated handle and having a concavity that holds a disposable insert element. The insert element is provided with a clear, tacky adhesive that captures insects coming into contact therewith.

U.S. Pat. No. 4,052,811 to Esther B. Shuster et al. discloses an insect catching device comprising a tape dispenser mechanism which is mounted on an elongated handle. The adhesive tape is supported on a resilient body such as a sponge-like support pad to immobilize an insect without crushing the same. The tape with the insect attached may be withdrawn from the roll and severed therefrom to dispose of the insect.

U.S. Pat. No. 1,623,006 to Edward Hamborg et al. discloses a fly catcher adapted to be held in the hand of an operator and wielded through the air to catch flies in flight. The fly catcher includes a holder for detachably receiving a cone shaped disc whereon a sticky substance such as that used on fly-paper is deposited to capture the flies.

U.S. Pat. No. 703,303 to William J. Purvis discloses a fly trap that is specially designed for catching flies after they have settled on a ceiling for the night. A fly trap comprises a suitable frame upon which sticky fly-paper is supported, a handle for said frame, novel means for securing the paper on the frame, and means for preventing contact of the sticky paper with the ceiling.

U.S. Pat. No. 602,083 to Charles A. Kimbel discloses a fly catcher comprising generally rectangular frame members which are pressed together to clamp a piece of sticky fly paper therebetween with the fly paper clamped thereon. The frame members are attached to an elongated handle such that the sticky surface of the fly-paper may be used to gather flies from the ceiling of the room.

U.S. Pat. No. 861,963 to Robert Fyfe discloses an insect destroyer comprising a pair of generally rectangular surfaces which are hinged together along one edge thereof and being provided with straps for the fingers and thumb of the user. The rectangular members are provided with disposable paper or cardboard strips which can be removed and replaced when soiled as insects are captured therebetween.

Finally, U.S. Pat. No. 3,996,690 to Ronald W. Ridings is considered of general interest in that it discloses a combination insect trap and swatter device wherein a receptacle containing an insect attracting substance is provided with a fly trap appendage for trapping insects therein. A yieldable arm arrangement supports a swatter above the top surface of a receptacle enabling the user to swat insects by manually depressing the uppermost arm.

SUMMARY OF THE INVENTION

After much research and study of the above mentioned problems, the present invention has been developed to provide an adhesive insect trapping device wherein a flat, rectangular plate member having a hinged cover member is attached to an elongated handle. The cover member includes a catch which extends to the handle to secure the plate member and cover member in coplanar relation in an open position of the device.

A sheet of adhesive material is disposed across the hinge juncture between the plate and cover members for capturing insects. After the trapping device is positioned over and pressed against an insect to capture the same, the catch is released and the cover member is folded 180° about the hinge to contact the plate member thereby sealing the captured insect within an adhesive envelope.

Thereafter, the sheet of adhesive material is removed to dispose of the insect and replaced with a new sheet of material for the next use.

In view of the above, it is an object of the present invention to provide an adhesive insect trapping device which can be utilized for capturing insects encountered on the interior of windows, walls, and ceilings in a convenient manner.

Another object of the present invention is to provide an adhesive insect trapping device suitable for use with detachable adhesive inserts which forms a sealed enclosure about the captured insect which may be disposed in a convenient and sanitary manner.

Another object of the present invention is to provide an adhesive insect trapping device which is lightly pressed into contact with the insect to be captured thereby eliminating the stains and residue resulting from crushing such an insect with a common fly swatter.

Another object of the present invention is to provide an adhesive insect trapping device which eliminates damage which is likely to occur to objects which would otherwise be struck by a conventional type of fly swatter.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
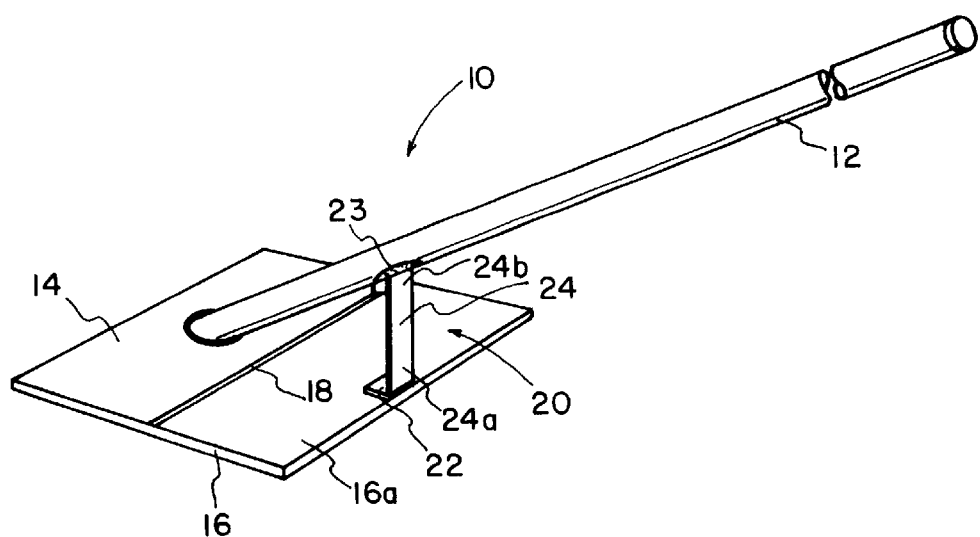
FIG. 1 is a perspective view of a preferred embodiment of the insect trapping device of the present invention.

With further reference to the drawings, an insect trapping device in accordance with the present invention is illustrated in FIG. 1 and indicated generally at 10.

In the preferred embodiment the insect trapping device 10 is comprised of an elongated handle 12 that is mechanically coupled to a plate member 14, and a cover member 16 being pivotally attached to the plate member 14 by a continuous hinge 18.

A catch assembly, indicated generally at 20 extends between the cover member 16 and the handle 12 and allows the cover member 16 to be retained in the open position folded back in coplanar relation with plate member 14 as shown in FIG. 1.

In the preferred embodiment the catch assembly 20 is comprised of a mounting bracket 22 being fixedly attached to an upper surface 16a of cover member 16 as seen in FIG. 1. The catch body 24 is adapted for pivoting attachment to the mounting bracket 22 at a proximal end 24a thereof. The catch body 24 is adapted for detachable engagement with handle 12 at the terminal end 24b thereof to secure the device 10 in the open position shown in FIG. 1.

In one embodiment mating portions of a hook and loop type fastener 23 such as that sold under the trade name VELCRO are provided and interposed between the terminal end 24b of the catch body 24 and the handle 12 to provide such detachable engagement.

Of course, other suitable fastening means may be utilized to secure the cover member 16 in the open position as shown in FIG. 1. Thus, the embodiment shown herein is merely illustrative and is not intended to be restrictive in any sense because numerous other fastening devices can provide this function.

In the embodiment shown in FIG. 1 handle 12 is fixedly attached to plate member 14 at a pre-determined angle of approximately 45° which has been determined to be optimal for all-purpose use of the device 10.

In an alternative embodiment the handle 12 can be made adjustable in relation to the plate member 14 by providing a ball and socket type joint (not shown) therebetween or other adjustable joint mechanism.

Since such adjustable ball and socket type joints are well known to those skilled in the art, further detailed discussion of the same is not deemed necessary.

Figure 2:
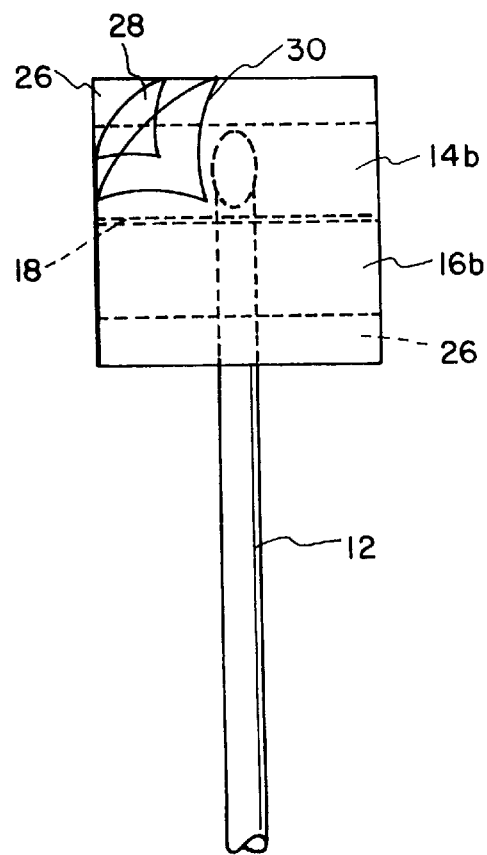
FIG. 2 is a bottom plan view of a preferred embodiment of the insect trapping device of the present invention.

Turning now to FIG. 2 there is shown therein a view of the underside of the plate and cover members 14 and 16. It can be seen that a pair of elongated mounting strips 26 are disposed along the opposed outer edges of the undersides 14b and 16b of the plate and cover members 14 and 16 respectively in generally parallel relation to hinge 18.

In the preferred embodiment a double-sided adhesive tape such as the type sold under the trade name "REMO ONE" is particularly well adapted for this purpose having adhesives of two different strengths on the opposed surfaces thereof.

Since such double-sided pressure-sensitive adhesive tape is well known to those skilled in the art, further detailed discussion of the same is not deemed necessary.

In accordance with the present invention, that side of the strips 26 having the strongest adhesive is applied to the undersides 14a and 16a of the plate and cover members 14 and 16 respectively to produce a permanent bond therebetween. Thus, the surface of the strips 26 having the removable adhesive is disposed away from the plate and cover members 14 and 16 to contact the back of an adhesive sheet or pad 28 which functions to capture insects as described hereinafter in further detail.

In normal use of the insect trapping device of the present invention a single adhesive sheet or pad 28 having an adhesive layer 28a on one side thereof is positioned on the mounting strips 26 with the device 10 in the open position as shown in FIG. 2.

It is contemplated that the adhesive pads 28 will be provided with an outer protective layer 30 to removably cover the adhesive-coated surface of the pad 28 until it is ready for use. Upon utilization the outer protective layer 30 of the pad 28 is peeled off and detached exposing the adhesive surface for capturing an insect.

Since such adhesive protective layers are well known to those skilled in the art, further detailed discussion of the same is not deemed necessary.

Figure 3A:
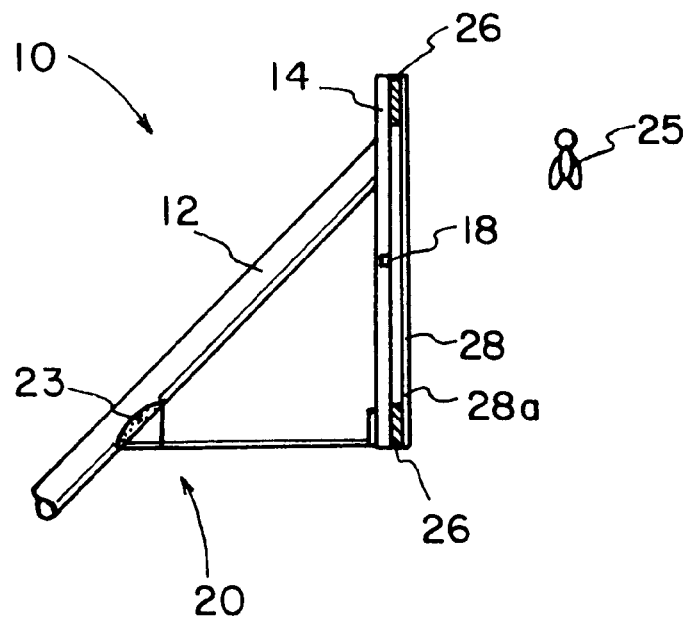
FIG. 3A is a partially cutaway side elevational view of the insect trapping device positioned over an insect to be captured.
Figure 3B:
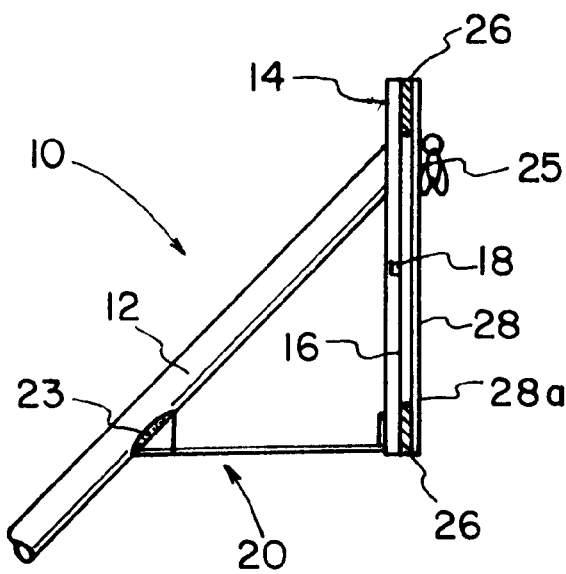
FIG. 3B is a partially cutaway side elevational view of an insect that has been adhesively captured on the adhesive sheet material.

When ready for use the insect trapping device 10 is positioned over the insect to be captured and lightly pressed into contact with the adhesive surface of pad 28 as shown in FIGS. 3A and 3B.

Figure 4:
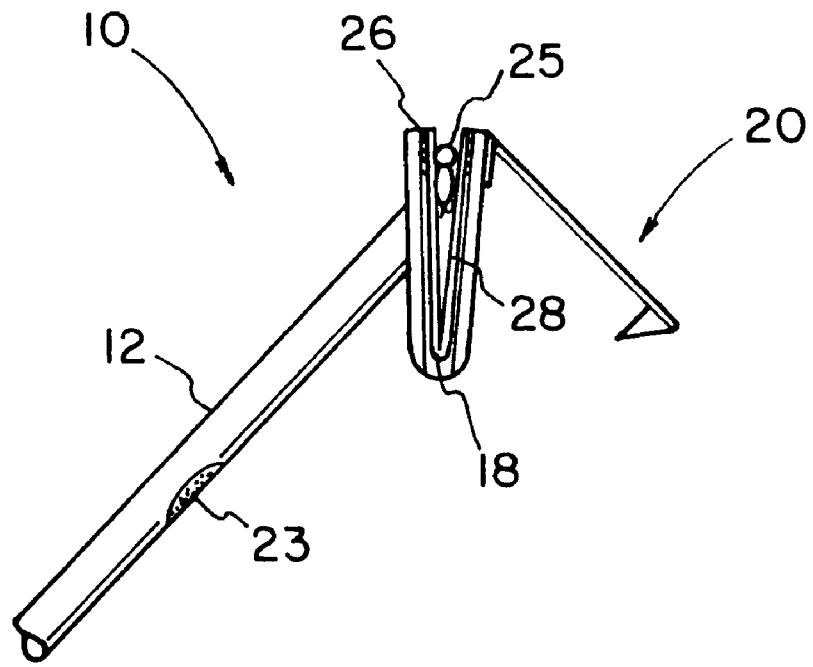
FIG. 4 is a partially cutaway side elevational view of the insect trapping device in the closed position showing the insect which has been adhesively captured.

Next, the catch body 24 is released from its point of attachment on handle 12 and the cover member 16 is folded 180° onto the plate member 14 thereby folding the adhesive pad 28 onto itself to the closed position as shown in FIG. 4.

This effectively seals the insect 25 in an envelope of adhesive material for disposal.

Thereafter, the cover member 16 is manually unfolded and the folded adhesive pad 28 including the trapped insect 25 may be conveniently removed and discarded. A new adhesive pad 28 is then applied to the device 10 for repeated use.

Figure 5:
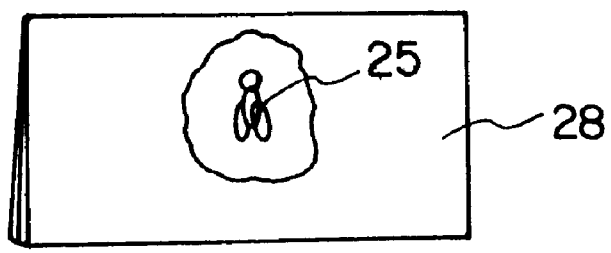
FIG. 5 is partially cutaway top plan view showing a single sheet of adhesive material folded onto itself and containing the insect entrapped therein after removal from the device.
Figure 6:
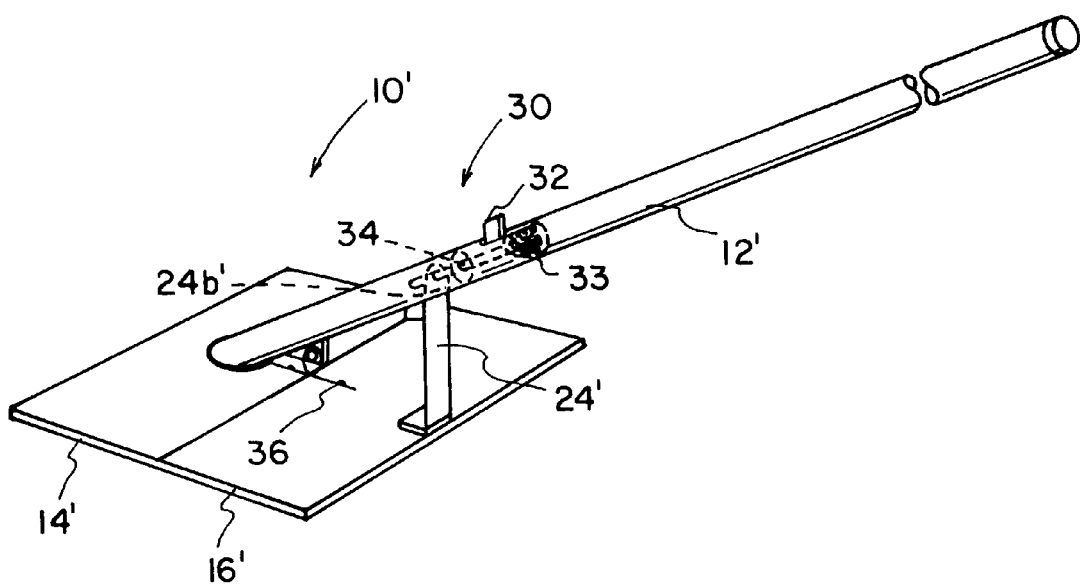
FIG. 6 is a perspective view of an alternative embodiment of the insect trapping device including a trigger actuated catch release mechanism.

Referring now to FIG. 5 there is shown therein an alternative embodiment of the insect trapping device of the present invention, illustrated generally at 10'. In this embodiment the handle 12' contains a catch release mechanism, indicated generally at 35. The catch release mechanism 35 includes a trigger 32 that is spring biased by means of a compression spring 33 to a position of engagement with the catch body 24' as shown.

A torsion spring 36 is positioned so as to lie in generally perpendicular relation across the hinge member 18 so as to spring bias the plate and cover members 14' and 16' to the closed position described hereinabove.

In practical use of this alternative embodiment of the insect trapping device 10' the cover member 16' is pivoted against the spring tension applied by spring 36 to the open position and the trigger 32 is retracted to engage an aperture 34 in the terminal end 24b' of the catch body 24'. Thereafter, the device 10' is positioned over an insect to be captured as described hereinabove.

Next, after the insect 25 sticks to the adhesive pad 28 the trigger 32 is withdrawn releasing the catch body 24' and the cover member 16' automatically folds 180° onto the plate member 14' due to the spring tension applied by spring 36.

Thereafter, the captured insect is sealed within the adhesive pad 28 and removed and discarded in the same manner described hereinabove.

From the above it can be seen that the insect trapping device of the present invention provides a simple and efficient means of adhesively capturing insects encountered on the interior surfaces of windows, walls, and ceilings. Further, the insect trapping device provides a convenient and sanitary means of disposal of the insects after they are captured.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An insect trapping device comprising:

a plate;

a cover being attached to said plate by hinge means such that said cover member is pivotable between an open position wherein said plate and said cover are generally coplanar and a closed position wherein said plate and said cover members are substantially parallel in overlying relation;

an adhesive sheet disposed on said plate and said cover, said adhesive sheet extending across said hinge means enabling said adhesive sheet to be folded 180° onto itself; an elongated handle mechanically coupled to said plate generally in the center thereof at an acute angle in relation to said plate; a catch being hingedly attached to the cover connecting between said cover and said handle in said open position and functioning to retain the cover in the open position, said catch means being releasably secured to the handle by a detachable fastening means, said catch being substantially perpendicular to said cover in said open position whereby an insect may be captured on said adhesive in said open position and enclosed within said adhesive in said closed position.

2. The insect trapping device of claim 1 wherein said acute angle is 45°.

3. The insect trapping device of claim 1 wherein said fastening means comprises mating portions of a hook and loop type fastener.

4. The insect trapping device of claim 1 wherein said fastening means includes a trigger actuated catch release mechanism.

5. The insect trapping device of claim 4 wherein said cover member is spring biased toward said closed position such that when said catch release mechanism is actuated said cover member automatically moves to said closed position.

6. The insect trapping device of claim 1 wherein said adhesive sheet means comprises a single sheet of adhesive material configured and dimensioned to conform to the outer periphery of said plate and cover members in said open position.

7. The insect trapping device of claim 6 wherein said sheet of adhesive material includes an adhesive coating on one side thereof.

8. The insect trapping device of claim 7 wherein said sheet of adhesive material is secured to said plate and cover members by a plurality of mounting strips comprising a double sided adhesive tape having adhesives of different strengths on opposite surfaces thereof.

9. The insect trapping device of claim 6 wherein said adhesive sheet means comprises a single sheet of a double sided adhesive material having adhesives of different strengths on opposite sides thereof.

* * * * *